United States Patent [19]

Corwin et al.

[11] Patent Number: 5,199,481

[45] Date of Patent: * Apr. 6, 1993

[54] METHOD OF PRODUCING REINFORCED COMPOSITE MATERIALS

[76] Inventors: John M. Corwin; Stewart T. Harman, both of Royal Oak; Kenton F. Michaels, Detroit; Theodore T. Racchi, deceased, late of Addison Township; Robert B. Andrusyszyn, legal representative, Rochester Hills, all of Mich.

[*] Notice: The portion of the term of this patent subsequent to Jun. 12, 2007 has been disclaimed.

[21] Appl. No.: 715,155

[22] Filed: Jun. 11, 1991

Related U.S. Application Data

[63] Continuation-in-part of Ser. No. 498,296, Mar. 23, 1990, Pat. No. 5,172,746, which is a continuation of Ser. No. 258,362, Oct. 17, 1988, Pat. No. 4,932,099.

[51] Int. Cl.$^5$ ............................................. B22D 19/00
[52] U.S. Cl. .................................... 164/98; 164/103; 164/105; 164/97
[58] Field of Search ................. 164/97, 103, 105, 120, 164/98

[56] References Cited

U.S. PATENT DOCUMENTS

| | | | |
|---|---|---|---|
| 3,547,180 | 12/1970 | Cochran | 164/61 |
| 3,828,839 | 8/1974 | Dhingra | 164/97 |
| 4,232,091 | 11/1980 | Grimshaw et al. | 428/472 |
| 4,390,583 | 6/1983 | Brazel | 428/113 |
| 4,450,207 | 5/1984 | Donomoto et al. | |
| 4,476,916 | 10/1984 | Nusbaum | 164/108 |
| 4,492,265 | 1/1985 | Donomoto et al. | |
| 4,506,721 | 3/1985 | Ban et al. | 164/108 |
| 4,534,400 | 8/1985 | Ban et al. | 164/97 |
| 4,548,253 | 10/1985 | Funatani et al. | 164/80 |
| 4,566,519 | 1/1986 | Ban et al. | 164/112 |
| 4,570,316 | 2/1986 | Sakamaki et al. | 164/97 |
| 4,572,271 | 2/1986 | Nakashima et al. | 164/97 |
| 4,586,554 | 5/1986 | Tank et al. | 164/97 |
| 4,600,556 | 7/1986 | Donachie et al. | 420/542 |
| 4,630,665 | 12/1986 | Novak, Jr. et al. | 164/110 |
| 4,633,931 | 1/1987 | Yamaguchi et al. | 164/110 |

(List continued on next page.)

FOREIGN PATENT DOCUMENTS

| | | |
|---|---|---|
| 0115742 | 8/1984 | European Pat. Off. ............ 164/102 |
| 150240 | 8/1985 | European Pat. Off. . |
| 0291441 | 11/1988 | European Pat. Off. . |
| 0364963 | 4/1990 | European Pat. Off. . |
| 0365978 | 5/1990 | European Pat. Off. . |
| 3404092 | 6/1985 | Fed. Rep. of Germany . |
| 2426520 | 5/1979 | France . |
| 25275 | 2/1982 | Japan . |
| 56-150 | 4/1982 | Japan . |
| 155579 | 8/1985 | Japan . |
| 61-48541 | 3/1986 | Japan . |
| 8603997 | 7/1986 | World Int. Prop. O. . |

OTHER PUBLICATIONS

"Tensile/Compressive Fatigue and Interface Characterization of Al$_2$O$_3$ Fiber/Al-2.5% Li Alloy Metal Matrix Composite," by Michael M. Buckley and Prof. J. Homeny, Jun. 1990.

"Lanxide's Two Near-Net-Shape Process Under Evaluation," by Robert R. Irving, Dec. 18, 1989, p. 38, Metalworking News Dec. 18 and 25 combined issue.

"Lanxide Corporation Opens New Materials Frontiers," MMCIAC Newsletter, Sep., 1989, vol. 9, No. 3.

"Metal-Matrix Composites-Materials of the Future," by R. A. Aronson, Machine Design, pp. 68-73 (Aug. 8, 1985).

"Advanced Metal Composites on the Move," by John
(List continued on next page.)

Primary Examiner—Richard K. Seidel
Assistant Examiner—Rex E. Pelto
Attorney, Agent, or Firm—Mark P. Calcaterra

[57] ABSTRACT

A method for producing a reinforced composite material. A molten matrix metal is heated to a temperature substantially greater than the melting point of the matrix metal. The matrix metal is poured into a mold containing a mass of reinforcing material, and an oxide layer formed from said molten matrix metal is ruptured so that the molten matrix metal infiltrates the mass of reinforcing material.

19 Claims, 6 Drawing Sheets

U.S. PATENT DOCUMENTS

| | | | |
|---|---|---|---|
| 4,653,569 | 3/1987 | Tank et al. | 164/119 |
| 4,662,429 | 5/1987 | Wada et al. | 164/461 |
| 4,664,961 | 5/1987 | Vees et al. | |
| 4,671,336 | 6/1987 | Anahara et al. | 164/110 |
| 4,687,043 | 8/1987 | Weiss et al. | 164/97 |
| 4,696,866 | 9/1987 | Tanaka et al. | 164/97 |
| 4,705,093 | 11/1987 | Ogino | 164/97 |
| 4,708,104 | 11/1987 | Day et al. | 123/193 P |
| 4,715,422 | 12/1987 | Tommis et al. | 164/97 |
| 4,755,437 | 7/1988 | Sabatie et al. | 164/97 |
| 4,766,944 | 8/1988 | Sakuma et al. | 164/97 |
| 4,802,524 | 2/1989 | Donomoto | |
| 4,828,008 | 5/1989 | White et al. | 164/97 |
| 4,852,630 | 8/1989 | Hamajima et al. | 164/761 |
| 4,901,780 | 2/1990 | Sasaki et al. | 164/120 |
| 4,901,781 | 2/1990 | Ruff | 164/900 |
| 4,932,099 | 6/1990 | Corwin | 164/103 |
| 5,000,247 | 3/1991 | Burke | 164/101 |
| 5,004,034 | 4/1991 | Park | 164/98 |

OTHER PUBLICATIONS

C. Bittence, Advanced Materials and Processes Incorporating Metal Progress, Jul., 1987, pp. 45–49.

"GE Claims Breakthrough in Plastics Development," by Amal Kumar Naj, Wallstreet Journal, Sep. 14, 1989.

"Internal Combustion Engine Fundamentals," by John Heywood, McGraw-Hill Book Co., pp. 604–609 (1988).

"Piston Thermal Deformation and Friction Considerations," by C. H. Li, Feb. 22–26, 1982, SAE Paper No. 820086.

"Ceramic Fiber Reinforced Piston for High Performance Diesel Engines," by Donomoto, Funatani, Miura, and Miyake, Feb. 28–Mar. 4, 1983, SAE Technical Paper No. 830252.

"MMC Pistons a Solution for 1990's High Output Diesels," by T. Bedwell, Feb. 27–Mar. 3, 1989, SAE Technical Paper No. 890595.

PCT Application, International Publication No. WO84/02927, International Publication Date Aug. 2, 1984.

PCT Application, International Publication No. WO83/02782, International Publication Date Aug. 18, 1983.

"Weight Reduction of Engine Parts for Motorcycles," by H. Iguchi, SAE Paper No. 871187, 1987.

"Compressive Fatigue Damage and Associated Property Degradation of Aluminum Matrix Composite," by Y. H. Huang and S. S. Wang.

"Solidification Processing of Metal-Matrix Composites," by Andreas Mortensen, James A. Cornie and Merton C. Flemings, 1208 Journal of Metals, 40 (1988) Feb., No. 2, Warrendale, PA., U.S.A.

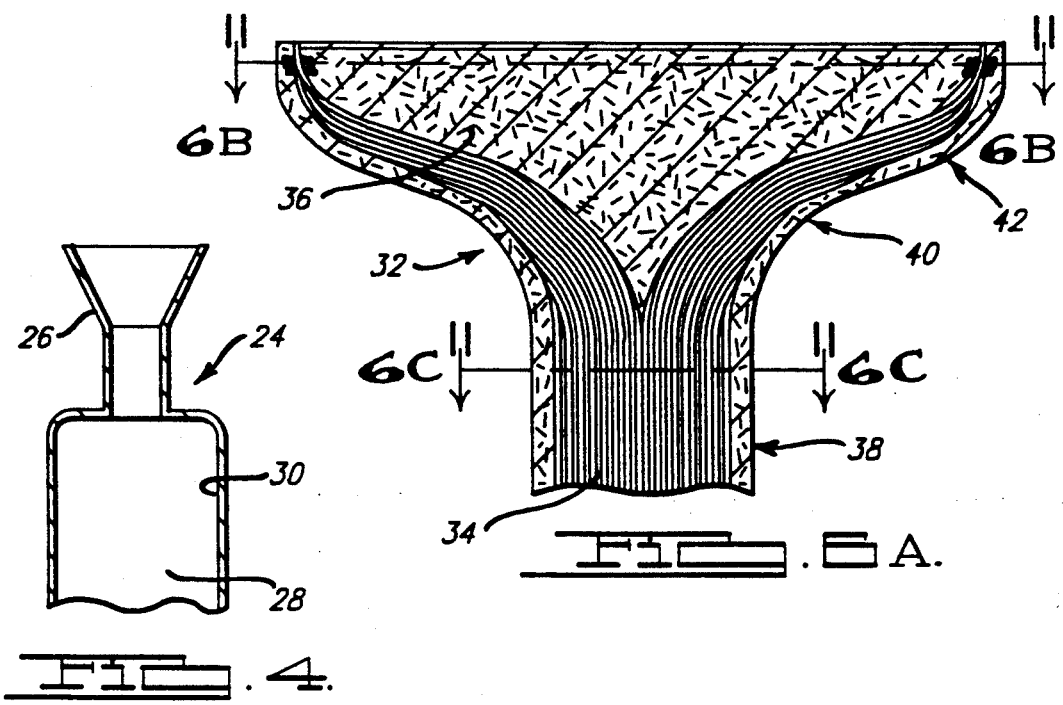
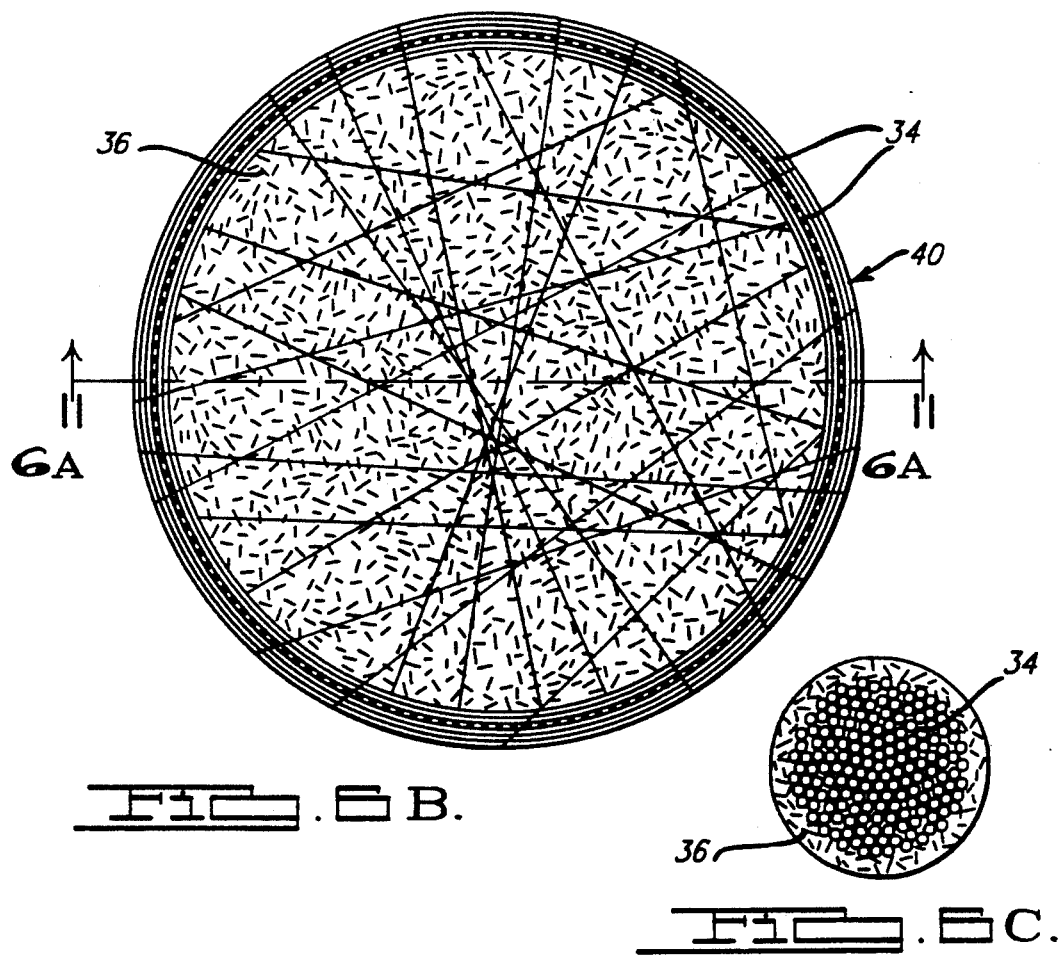

|←2mm→|

METHOD OF PRODUCING REINFORCED COMPOSITE MATERIALS

CROSS REFERENCE TO A RELATED APPLICATION

This application is a continuation-in-part application of U.S. patent application Ser. No. 07/498,296, filed Mar. 23, 1990, now U.S. Pat. No. 5,172,746, and entitled "A Method of Producing Reinforced Composite Materials", which is a continuation application of U.S. patent application Ser. No. 07/258,362, filed Oct. 17, 1988, now U.S. Pat. No. 4,932,099, and entitled "A Method of Producing Reinforced Composite Materials" both of which are hereby expressly incorporated by reference.

BACKGROUND OF THE INVENTION

1. Technical Field

This invention relates to reinforced composite materials having a metal matrix. More particularly, this invention relates to a method of producing a composite material employing an aluminum matrix metal and a ceramic reinforcing material.

2. Description of Related Art

Recent technological advances, particularly in the automotive and aerospace industries, have seen the increased need for stronger, lighter, and more durable materials. To meet this demand, materials formulators and producers have directed their attention towards improving the physical properties and ease of manufacture of presently known composite materials.

One composite material that recently has received increased attention is the metal-matrix composite material. In a typical metal-matrix composite, a mass of reinforcing material, such as a ceramic, is dispersed within a matrix of metal. For applications requiring high material strength-to-weight ratios, aluminum alloys have been a popular matrix metal.

U.S. Pat. No. 4,932,099 (herein expressly incorporated by reference) discusses various conventional methods for manufacturing metal matrix composites. In general, conventional methods and articles are time consuming, expensive, require high pressures, are limited to the fabrication of articles having simple shapes, or to the fabrication of articles that employ a single type of preform, or otherwise possess attributes making the process undesirable in certain commercial-scale production respects, particularly in automotive applications.

SUMMARY OF THE INVENTION

By way of summary, the methods of the present invention relate to the discovery that by heating a molten matrix metal and a casting mold to a certain temperature range prior to pouring the molten matrix metal, and by casting the molten matrix metal into the mold under preselected conditions to rupture an oxide layer formed from the molten matrix metal, the infiltration of the alloy into a mass of reinforcing material is dramatically improved. In general, the methods of the present invention include the steps of heating a molten matrix metal alloy to a temperature greater than the melting point of the matrix metal, and preferably substantially greater than the melting point. The molten matrix metal is poured into a mold containing a mass of ceramic reinforcing materials. Preferably, an oxide layer formed from the molten alloy is ruptured to permit relatively rapid infiltration of the molten matrix metal into the mass of reinforcing material. The matrix metal is allowed to solidify.

In one preferred embodiment of the present invention, the mass of reinforcing material comprises a hybrid preform configuration. Such a hybrid preform configuration is a single preform that integrates a plurality of different preform types. The hybrid preform configuration permits the formation of metal matrix composite articles having advantageous properties at preselected locations in the article. As a result, further control over the resulting properties of metal matrix composite articles is possible at potentially increased cost savings as compared with using preform configurations of a single homogeneous type of preform.

In another preferred embodiment of the instant invention, the preforms (both homogeneous and hybrid types) are fabricated, according to specific methods, for use as reinforcing material in a metal matrix composite. Preforms having relatively complex configurations can be produced relatively efficiently using such methods. Improved control over preform tolerances, resulting in improved yield of useful preforms, is achievable by the present methods.

In another preferred embodiment, specific useful articles (such as automotive components) are prepared in accordance with the instant methods. Such articles comprise either homogeneous or hybrid-type preform configurations. Among the many advantages of the methods and articles of the present invention is that complicated shapes can be dependably formed at relatively low cost. Articles produced by the present methods exhibit the desired properties of metal-matrix composites, such as a relatively high strength-to-weight ratio, a relatively high compressive fatigue strength, commercially useful stiffness characteristics, and relatively good operating characteristics at temperatures significantly higher than normally practiced with unreinforced matrix alloy, e.g., in the range of about 300° F. to about 600° F. for aluminum alloys. Such features are particularly desirable in the automotive industry.

In still another embodiment of the instant invention, a specific type of mold is prepared and used for casting the instant metal matrix composites. In a highly preferred embodiment, the mold is substantially gas-tight. Such molds contribute to substantially improved control over the step of rupturing the oxide layer formed from the molten matrix metal. In turn, relatively rapid infiltration rates of molten matrix metal into the mass of reinforcing material is possible. For instance, using the instant preferred molds, the step of infiltrating the matrix metal into the mass of reinforcing material can be done at an infiltration rate as fast as about 20 inches per second, more preferably as fast as about 40 inches per second, and still more preferably at an infiltration rate as fast as about 86 inches per second or faster. While it is believed that such rates are achievable regardless of the cross-sectional area taken along the length of a specimen, an example of one specimen for which such rates are achievable is one having cross-section dimensions of about ⅛ inch by about ⅛ inch.

In yet another embodiment, the wetting and infiltration characteristics of the reinforcing material are enhanced by a step of preconditioning such reinforcing material with an effective amount of a preconditioning material. Without intending to be bound by theory, it is believed that such preconditioning step results in the lowering of the contact angle between the molten matrix metal and the reinforcing material. As a result, an improvement in the ability to wet and infiltrate the reinforcing material with molten matrix metal is possible.

BRIEF DESCRIPTION OF THE DRAWINGS

Other objects, features and advantages of the present invention will become more fully apparent from the following detailed description of the preferred embodiments, the appended claims and the accompanying drawings in which:

FIG. 4 is a cross-sectional view of a metal mold.

FIG. 6A is a cross-sectional view of a valve preform made according to the methods of the present invention, taken along a longitudinal plane.

FIG. 6B is a section of a valve like the valve in FIG. 6A (sectional cross-hatching omitted for clarity).

FIG. 6C is a section of a valvelike the valve in FIG. 6A.

DETAILED DESCRIPTION OF THE PREFERRED EMBODIMENT

The ceramic-reinforced composite materials produced by the methods of the present invention demonstrate many advantages over art-disclosed composites including, without limitation, excellent strength-to-weight properties; amenability to relatively rapid and inexpensive production of parts that are large and/or have complicated geometric shapes, particularly without the need to employ high pressures; and excellent compressive fatigue strength.

The present invention relates to improvements to technology based on the discovery that heating a molten matrix metal to a temperature substantially greater than its melting point, and then pouring the metal into a preheated mold, containing a mass of ceramic reinforcing material, dramatically improves the ability of the metal to infiltrate into and adhere to the mass of reinforcing material. Aspects of such technology are disclosed in U.S. Pat. No. 4,932,099, which is hereby expressly incorporated by reference. The invention further relates to improvements to technology based on the discovery that by rupturing an oxide layer formed by the molten matrix metal, the infiltration time of the molten matrix metal into the mass of ceramic reinforcing material is significantly lowered as compared with conventional methods. The step of infiltrating metal into the mass of reinforcing material thus can be performed at commercially practicable and attractive infiltration rates (e.g., as fast as about 86 inches per second).

REINFORCING MATERIAL PREFORMS

Figure 1:
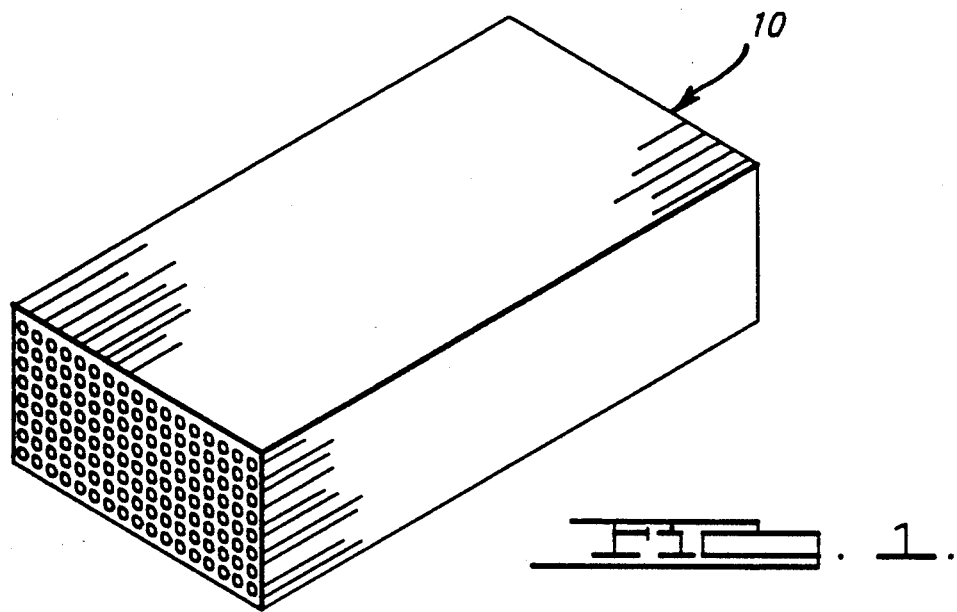
FIG. 1 illustrates a typical preform containing continuous, uniaxial reinforcing fibers.

Referring to FIG. 1, a ceramic reinforcing material useful to produce an article pursuant to the present invention is provided in a preformed body or preform 10. In one preferred embodiment, the preform 10 contains a mass of randomly packed reinforcing material, such as thin ceramic fibers. In another preferred embodiment a plurality of the fibers (e.g., a cluster of fibers) are oriented substantially in a single direction (i.e. uniaxial). Multiple clusters may be employed. Though not intended as limiting, preferably the fibers have a relatively high modulus (e.g. on the order of about $55 \times 10^6$ psi); a relatively high compressive strength (e.g. greater than about 500,000 psi); and a minimum tensile strength of at least about 70,000 psi (and more preferably about 200,000 psi). In addition, it is preferable that the fibers have a relatively high aspect ratio (i.e. ratio of length to diameter dimensions), and preferably one that is greater than about 200; and a fiber diameter of at least about 2 microns. Smaller diameters (e.g., as low as about 1.5 microns) are also contemplated. Fiber diameters up to about 50 microns or larger are also possible. The skilled artisan, of course, will appreciate that the above criteria can be modified upwardly or downwardly from the suggested values and still fall within the scope of the present invention.

Further, preferably the fibers are substantially smooth, generally chemically inert, stable at relatively high temperatures, and generally not electrically conductive. Of course, in some applications it is contemplated that certain characteristics (e.g. thermal conductivity, electrical conductivity and thermal expansion) can be modified to satisfy the demands of a particular application.

At the outset, upon providing the reinforcing material, the reinforcing material generally is bound together by a suitable binder or adhesive. Such binder or adhesive may be an organic or inorganic material, and preferably is a material in which reinforcing material may be suspended to aid in forming a preform. The binder or adhesive also should be susceptible to being removed from the resulting preform by such known methods as burning out (e.g., by exposing the binder to a temperature sufficient to decompose the binder into gaseous products and removing the resulting gasses such as by evacuation); solvent extraction techniques; melt extraction techniques, evaporation techniques or combinations of the above methods. Examples of binders suitable for employment in the present methods include waxes such as carnauba or paraffin, suitable plastics (such as acrylics), salt compounds, and in some instances even some relatively low melting point metal alloys (such as indium alloys).

Further, it is possible that the binder may have one or more conventional additives therein for modifying specific properties of the binder, such as its viscosity. Also the binder may contain a fiber preconditioning material (discussed in further detail herein) or its precursor to be left as a coating residue on the fibers after binder removal.

Accordingly, to manufacture a preform having a reinforcing material dispersed in a binder, it is preferable to infiltrate the reinforcing material with the binder to form a predetermined configuration. Such methods are known in the art. For instance, one method contemplates using a binder, in an initially relatively fluid or liquid state, as a suspension agent for randomly oriented reinforcing material. The randomly oriented reinforcing material is admixed with the binder, and the resulting admixture can be introduced into a mold cavity to form a net-shape or near-net shape component.

In another embodiment, preforms having both a randomly oriented and a substantially non-randomly oriented reinforcing material, can be prepared by contacting the random dispersion of reinforcing material (in binder) with the substantially non-randomly oriented reinforcing material. In this manner, it is possible to substantially surround some or all of the substantially non-randomly oriented reinforcing material with randomly oriented reinforcing material to form a single preform. This should result in a rigid or semirigid preform that can be handled readily during subsequent processing steps.

An example of a preferred preform is the so-called DUPONT FP preform supplied by DuPont. The DUPONT FP comprises an uniaxial mass of randomly packed alumina ($Al_2O_3$) fibers bound together by a wax binder. The fibers typically are provided commercially in a yarn form, which includes a plurality of filaments. DuPont FP fibers generally have the characteristics approximately as set forth in Table I:

TABLE I

| Composition | >99 α-$Al_2O_3$ |
|---|---|
| Tensile Modulus | 55 × $10^6$ psi |
| Tensile Strength | 200,000 psi minimum |
| Melting Point | 2045° C. (3713° F.) |
| Filament Diameter | 20 microns |
| Cross Section | Round |
| Filaments per Yarn | Nominal 200 |
| Length/Weight | Approx. 7000 ft/lb |
| Density | 3.9 g/$cm^3$ (0.141 lb/$in^3$) |

In some applications, the properties of the fiber used may vary. The length of such fibers, of course, will vary according to design considerations needed to accommodate the article to be produced.

The packing density (i.e. the volume percentage of the entire preform occupied by fibers) of the fibers, or other reinforcing material, in the preform is governed by considerations such as the overall geometric configuration of the preform and the desired resulting properties of the preform. Ease of handling the preform may also be a consideration. That is, in many instances, a certain amount of binder is desirable to maintain the reinforcing material in a substantially rigid or semirigid predetermined configuration, so that it can be manipulated readily during processing.

Additionally, the volume percentage of binder in the preform preferably corresponds substantially with the approximate volume percentage of metal that will be present in the final metal matrix composite article. The volume percentage of metal, in turn, at least partially governs the resulting thermal, mechanical, and physical properties of the final metal matrix composite article, and can be chosen to precisely tailor such properties.

Another consideration relates to the observation that improved casting results are possible according to the present methods when, upon subsequent binder removal steps, the reinforcing material is allowed to "expand" and fill the cavity of a mold to help secure the reinforcing material in place during casting and to help avoid having loose fibers floating out of a mold between subsequent steps of pouring molten metal and rupturing the oxide surface layer. This is accomplished by packing reinforcing material in the binder in a general state of compression. Upon binder removal, the compressive stresses are substantially relieved. Reinforcing material thus tends to travel outwardly i.e. away from the center of the preform. In turn, reinforcing material is urged toward the walls defining the mold cavity. In this manner, it is possible to move reinforcing material into difficult-to-reach portions of the mold cavity to facilitate the production of castings having complex shapes. Also, preforms prepared in this manner tend to exhibit a desired reduced likelihood of shifting within the mold cavity during casting. Accordingly, additional control over fiber shifting and the orientation of reinforcing material (and the attendant mechanical properties) in the resulting metal matrix composite articles is possible.

In view of the above, it is preferred that the volume percentage of reinforcing material in the preform ranges from about 3 to about 65 percent of the overall preform volume, and more preferably from about 3.5 to about 55 percent. The balance of the preform, of course, will comprise binder or adhesive. Without intending to be bound by theory, it is believed that successful casting using these unexpectedly broad ranges (particularly at the lower end of the ranges, e.g. to as low as about 3 volume percent) is made possible by the methods of the present invention, and particularly is possible due to the absence of the need for relatively high pressures, such as are customarily encountered using known popularly employed squeeze-casting or high pressure methods.

In another embodiment, such as where only a single type of preform (e.g., continuous fiber preform) is employed, the volume percent of the preform that is occupied by reinforcing material ranges from about forty to about sixty-five percent of the overall preform volume. In a more preferred aspect of such embodiment, the approximate volume percent of fibers is fifty to fifty five percent. In some instances it is possible to decrease such volume percentage to below forty percent.

It should be noted that it is also possible to vary the packing density of reinforcing material at various locations within a single preform by selectively taking into account the above considerations. For example, in some complex configurations it may be desirable to have a particular portion of a resulting article be substantially devoid of reinforcing material. Accordingly, for that portion of the preform, the volume percentage of reinforcing material will be about zero. The present method enables the formation of such type of preform and resulting metal matrix composite article, without imposing limitations upon the location of low or zero reinforcing material volume.

Any suitable type or composition of reinforcing material may be employed in the methods and articles of the instant invention. For instance, examples of alternative suitable reinforcing materials are selected from ceramic systems based upon silicon (Si), aluminum (Al), magnesium (Mg), titanium (Ti), or mixtures thereof. In this regard the ceramic system may be selected from any of the known variety of ceramic systems such as, without limitation, carbides, oxides and nitrides. Alternate reinforcing materials may also be based on systems including boron, carbon, silicon (e.g. silicides, such as $MoSi_2$), suitable intermetallic compounds (e.g. compounds containing two or more elements selected from Fe, Ni, Ti, or other suitable transition metals), likewise may be employed. Mixtures of any of the above-suggested reinforcing materials may also be employed. In a highly preferred embodiment, the reinforcing material is based upon $SiO_2$, SiC, $Al_2O_3$, $Al_2O_3$-$SiO_2$, MgO- Al$_2$O$_3$-SiO$_2$ and mixtures thereof. Still more preferably the reinforcing material is made of alumina (and specifically Al$_2$O$_3$), mullite (and specifically Al$_2$O$_3$.SiO$_2$) or mixtures thereof.

In addition to the aforenoted, examples of other preferred types of preforms useful in the present methods include, but are not limited to, preforms prepared from continuous fibers (such as DuPont's FP), short length fibers (e.g. chopped fibers, particulates, or the like), mat fibers (e.g., materials having aspect ratios of greater than about 20x, and preferably greater than about 100x), fiber whiskers (e.g., materials having a diameter of less than about 1 micron and an aspect ratio of less than about 20x), foam, extrusions or mixtures thereof (e.g., preforms that comprise mixtures or hybrids of the above types of preforms). It is preferred that the ceramic reinforcing material provided in these preforms be based upon silicon, aluminum, or mixtures thereof.

CASTING TECHNIQUES

Figure 2:
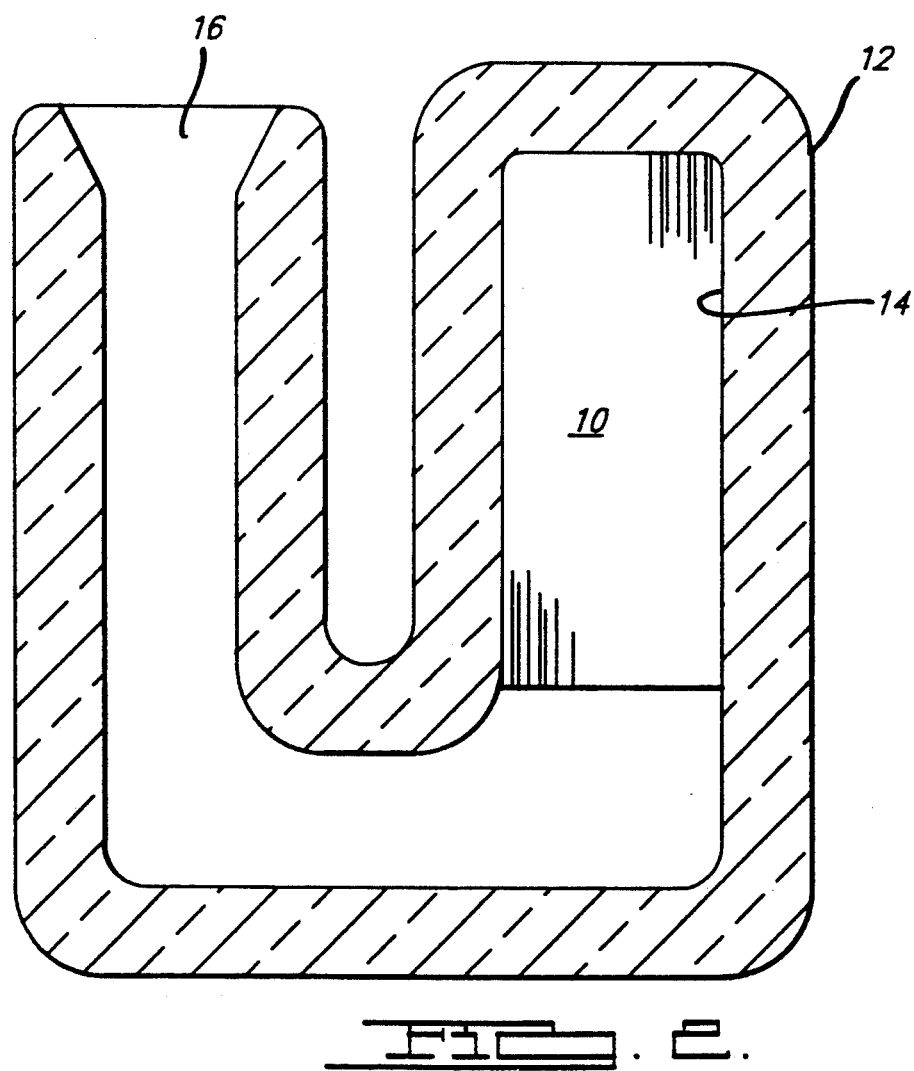
FIG. 2 illustrates a mold used to cast parts pursuant to the present invention.

Referring to FIG. 2, for a preform that contains a binder, the preform 10 is placed in a mold 12 having a mold cavity 14, and walls defining an opening 16 for receiving molten metal. Preferably, where the binder is removed by burn-out, the mold 12 containing the preform 10 is heated to a temperature in the range of about 400° F. to about 1,800° F. to burn out or otherwise remove the binder from the preform. In the case of investment casting molds described further herein, heating also serves the additional function of firing the investment casting mold. When the preform does not contain a binder, of course, the binder removal step may be omitted. One skilled in the art will appreciate that when employing some preforms such as a rigid preform (e.g., a reticulated ceramic foam), design provisions (such as protuberances or other anchor like projections) may be incorporated in the preform shape to assure retention of the preform from substantial movement in the mold cavity.

Figure 3:
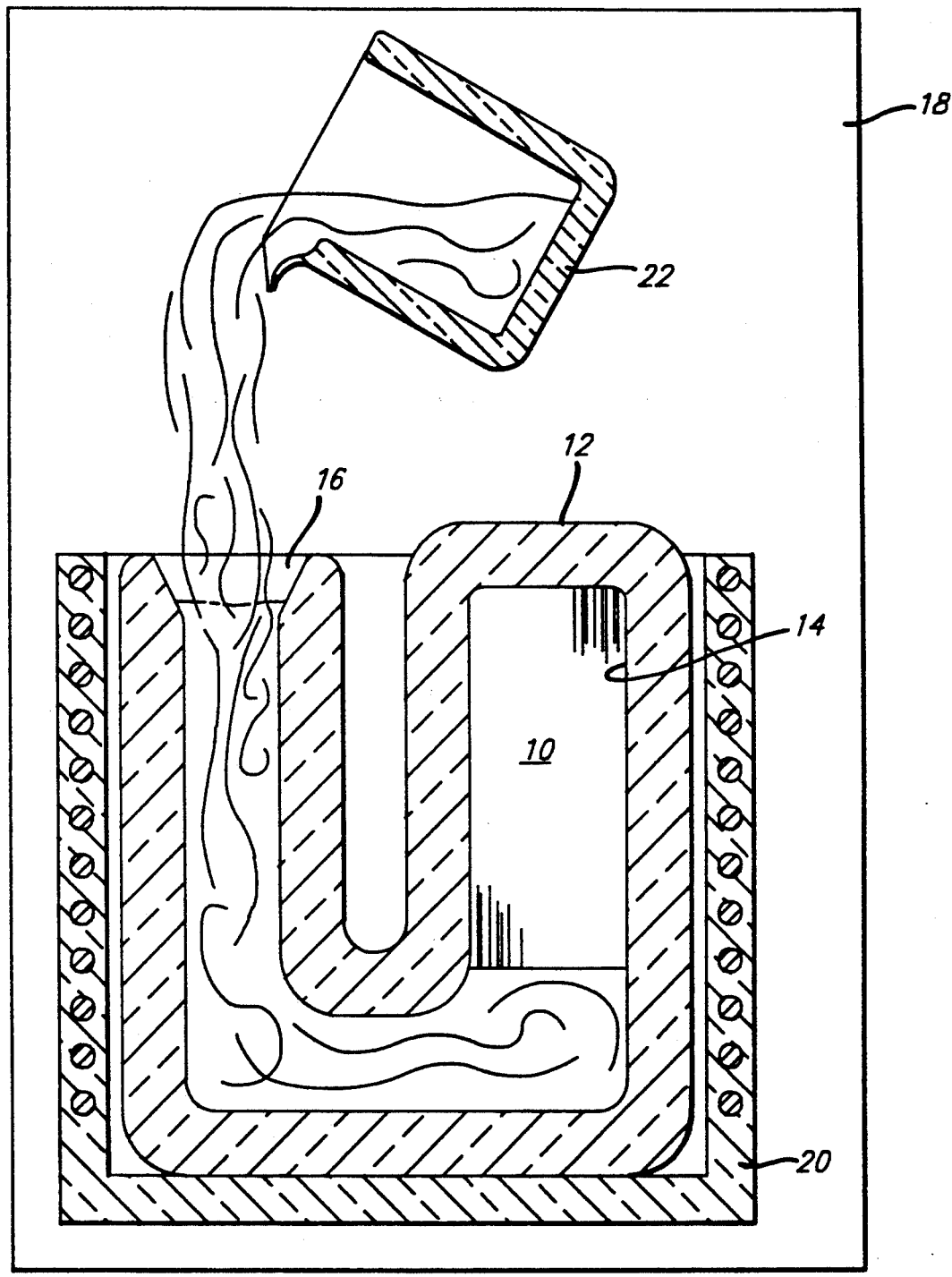
FIG. 3 illustrates the pouring of molten metal into a mold like the one shown in FIG. 2.

Referring to FIG. 3, the mold 12 with the preform 10 contained therein is placed in a chamber 18 capable of being evacuated. The chamber 18 is evacuated to a first pressure. The first pressure preferably is sufficient to remove gases that potentially could react with the metal matrix and/or reinforcing material to yield undesired reaction products. Accordingly, in a preferred embodiment, the chamber is evacuated to a pressure of about 0.05 to about 0.25 mm Hg, more preferably about 0.10 to about 0.25 mm Hg, still more preferably less than about 0.2 mm Hg, and still more preferably about 0.1 mm Hg. Preferably, the mold 12 containing the preform is heated by a suitable furnace 20, such as a resistance furnace, while within the chamber. The mold is heated to attain a predetermined temperature in the regions of the mold that are substantially adjacent to the reinforcing material. Preferably, the temperature is approximately the temperature that the molten metal is to be poured. Thus, when the matrix metal is an aluminum alloy, the mold is heated to a temperature in the range of about 1,300° F. to about 2,200° F. More preferably, the mold is heated to a temperature in the range of about 1,300° F. to about 1,900° F. Still more preferably the mold is heated to a temperature in the range of about 1,500° F. to about 1,900° F. Such preheating step occurs for a time of about 10 to about 60 minutes prior to melting the matrix metal. Of course, longer or shorter times may be employed depending upon factors such as the shape, size, and material of the mold. The mold is maintained at such a temperature substantially throughout the step of pouring the molten matrix metal.

The matrix metal is melted and heated in a melting furnace 22, having suitable provisions (as shown) for pouring molten metal into the mold cavity 14 (which also is contained within the chamber 18). Preferably the matrix metal is brought to a temperature substantially greater than the melting point of the matrix metal, and preferably a temperature high enough to enhance and promote wetting of the reinforcing material during subsequent casting steps.

In a preferred embodiment the matrix metal is an aluminum-based alloy (i.e. it contains greater than about 50% by weight aluminum). It is contemplated, however, that the method and articles of the present invention could be modified consistent with the present teachings so that any suitable matrix metal may be employed. Accordingly, alternate matrix metals that are contemplated as being within the scope of the present invention include, without limitation, those containing one or more of iron, titanium, nickel, cobalt, copper, tin, magnesium, zinc, chromium or the like.

In general, the aluminum-based matrix metals useful in the present invention include those which contain magnesium (Mg), copper (Cu), silicon (Si), and chromium (Cr). In this regard, preferred matrix metal alloy systems include, without limitation, Al-Mg, Al-Mg-Si, Al-Mg-Cu, and Al-Mg-Cr. More preferably the aluminum alloy is one which contains about 3.9% atomic percent magnesium or about 3.5% magnesium (by weight). In alternative embodiments, magnesium may be omitted, substituted, or supplemented with any suitable element or combination of elements to help tailor the properties of the resulting material. For instance, additions of silver could help improve fatigue properties. Additions of a hardening element, such as tantalum, may enhance the characteristics of the metal where such metal will be subject to relatively high stresses while operating at relatively high temperatures.

The present preferred aluminum alloys are heated to a temperature in the range of about 1,700° F. to about 2,200° F., more preferably about 1,800° F. to about 2,200° F., and still more preferably in the range of about 1,900° F. to about 2,050° F. It is believed preferable to heat this alloy to these high temperature ranges to take advantage of the reaction between the liquid metal and the ceramic reinforcing fibers in this temperature range. That is, without intending to be bound by theory, it is believed that when the molten alloy contacts the oxide ceramic fibers at these high temperatures an exchange reaction occurs between oxygen from the oxide ceramic fibers and the aluminum and magnesium (if present) in the alloy. This reaction is believed to promote wetting of the ceramic fibers. The wetting, in turn, enhances the capillary forces which drive the infiltration of liquid metal into the mass of ceramic fibers. It should be noted that, in some instances, heating the aluminum alloy to a temperature lower than about 1800° F. still yields an unexpected improvement in the infiltration of the matrix metal into the preform. For example, it is possible to decrease the temperature to as low as about 1,300° F., particularly when the preform has been preconditioned according to the methods described further herein.

Where magnesium or other alloying elements are present in the matrix metal alloy during heating and melting of the matrix metal alloy, it is preferable that the chamber pressure be maintained at a second pressure that is sufficient to help prevent alloying elements (such as the magnesium) in the matrix metal from boiling. In this regard, the skilled artisan will appreciate that at the present preferred temperatures the vapor pressure of elements such as magnesium tends to promote a boiling reaction. The vapor pressure of magnesium is calculable from known thermodynamic data. At a temperature of about 1,900° F., for an aluminum alloy containing about 3.5 percent (by weight) magnesium, this corresponds to a vapor pressure in the range of about 0.55 to about 1.1 mm Hg and more preferably of about 0.76 mm Hg absolute. Accordingly, to help avoid the depletion of the alloying elements, such as magnesium, and to help avoid other undesirable consequences of boiling, during the step of heating the matrix metal, the chamber pressure preferably is maintained at about such vapor pressure of the magnesium.

Chamber pressure can be controlled by any suitable manner. For instance, prior to heating, pressure could be controlled by flowing a predetermined amount of a substantially non-reactive gas (e.g. nitrogen, helium, argon, or the like) through the chamber. This also has the effect of purging the chamber of undesired gasses. The chamber is evacuated to the first pressure, previously discussed. Thereafter the substantially non-reactive gas is controllably introduced into (or evacuated from) the chamber to increase or decrease the chamber pressure to its desired level.

The molten alloy is poured from the melting furnace 22 into the heated mold cavity 14, containing a preform 10, through the opening 16 in the mold 12, as shown in FIG. 3. In another embodiment, the mold 24 shown in FIG. 4 can be substituted for the mold 12. That mold 24, is a metal mold, discussed further herein. It includes a downsprue 26 that leads into a cavity 28 for containing a preform defined by an interior surface of a mold wall 30. It should be realized that the pouring conditions employed in the present method tend to render the liquid-vapor interface of the molten liquid particularly susceptible to oxidizing and forming a thin oxide layer which tends to inhibit the flow of liquid metal over the reinforcing material, and therefore, the wetting of the reinforcing material.

To alleviate this problem and to promote a relatively rapid infiltration rate (as compared with a process without this step), the oxide layer is ruptured. Accordingly, in one preferred embodiment, the chamber pressure is increased to a third pressure, preferably of about 760 to about 1500 mm Hg, by introducing into the chamber a substantially non-reactive gas such as nitrogen, argon, or helium almost immediately after pouring the matrix metal. This increase of pressure should be sufficient for the chamber atmosphere to rupture the oxide layer and permit molten metal to wet the reinforcing material. Other methods for rupturing the oxide layer include mechanical agitation methods, such as by application of acoustic energy or ultrasound at an amplitude and for at least a time sufficient to infiltrate substantially the entire preform with molten metal.

These conditions are maintained in the chamber until the infiltration of the reinforcing material preform with molten metal is substantially complete. The casting is then solidified and allowed to cool. Cooling may be accomplished in any conventional manner. Thus, there optionally may be provisions associated with the mold to affect cooling rates, e.g. risers or hot tops, chills, mold geometry, or a combination thereof.

HYBRID-TYPE PREFORMS AND ARTICLES FORMED FROM PREFORMS OF THE PRESENT INVENTION

As noted above, the instant invention contemplates that metal matrix composite articles can be formed which incorporate hybrid preforms, or which incorporate preforms of a homogeneous type of preform. One aspect of the present invention is predicated upon the discovery that by employing the various steps of the present casting methods, relatively high integrity castings can be obtained using the hybrid preforms. Heretofore, it has been observed that using certain methods, such as known squeeze-casting methods, generally it is difficult to cast articles employing certain types of preforms. For example, fragile types of preforms, such as relatively low volume percentage chopped fiber preforms (with or without a binder) tend to break up, shift or become displaced in the mold cavity by the relatively high pressures associated with squeeze casting methods. As a result it is often difficult to squeeze cast using low volume percent chopped fiber preforms and/or preforms without a binder, and resulting properties of the final article could deviate from those desired.

The present methods, however, avoid the need for such high pressures. Thus, relatively fragile preforms (and often times less expensive preforms such as those containing low aspect ratio fibers e.g. chopped fibers, loose shot or other non-fibrous components) can be employed in the present methods. In regard to hybrid types of preforms, the ability to use such preforms is particularly advantageous. That is, two or more types of preforms can be positioned into preselected regions of a mold cavity (depending upon the desired properties and characteristics for that region), without significant concern for shifting of the preform materials in the mold cavity. This permits additional control over and selectivity of various properties or attributes (e.g. physical, mechanical, and resulting cost) of the ultimate metal matrix composite material.

Figure 5:
FIG. 5 is a photomicrograph showing the microstructure of a metal matrix composite formed using a hybrid preform of the present invention.

To illustrate, FIG. 5 is a photomicrograph that depicts the microstructure of a metal matrix composite employing a hybrid preform. Three distinct types of preform materials, continuous fiber (lower right portion of FIG. 5), chopped fibers (lower left portion of FIG. 5 containing the 2 mm scale marker), and foam (upper portion of FIG. 5), are shown in the photomicrograph as being part of the same casting. The darker background generally represents reinforcing material, the lighter portions generally represent metal matrix material. As can be seen, the integrity of the material is good and there is substantially no shifting of the separate types of reinforcing material as would otherwise be illustrated by substantial integration and penetration of the separate types of reinforcing material into one another.

To prepare a casting such as illustrated in FIG. 5, the various types of preforms are fabricated into preselected shapes, fitted or joined together and placed within a mold cavity. The preforms are then infiltrated with molten metal to form the composite.

Various useful articles can be produced using the preforms of the instant invention either singly, or in combination (i.e. as a hybrid preform). A particularly attractive feature is that lesser expensive reinforcing materials selectively can be employed in a hybrid preform to yield desired physical or mechanical characteristics in the resulting metal matrix composite article. This represents a significant commercial advantage.

tage of properties such as high machinability, tribological properties, and low cost.

TABLE II

| Preform Type | Typical Percentage of Volume Occupied by Reinforcing Material | Relative Cost of Preform | Processing Characteristics (e.g. Machinability) | Relative Physical or Mechanical Characteristics of Composite | | | | | | |
|---|---|---|---|---|---|---|---|---|---|---|
| | | | | (1) Tribology | (2) Modulus | (3) Fatigue Resistance | (4) Compressive Strength | (5) Tensile Strength | (6) High-temperature Strength | (7) Thermal Expansion |
| Continuous Fibre | | | | | | | | | | |
| (Long) | H | H | L | H | H | H | H | H | H | L |
| (Tran) | H | H | L | L | L | L | M | L | L | M |
| Chopped Fibre | L | L | H | M | M | M | M | M | M | M/H |
| Foam | L/H | L | L | M | L/H | L | L/M | L | L | L |
| Whiskers | L | H | M | M | L/M | L/M | L | L | L | M/H |
| Particulates | H | L/M | M | L/H | L/M | L | L | L | L | M/H |
| Extrusions | | | | | | | | | | |
| (Long) | L | L | L | M | L/H | L | H | M | M | L |
| (Tran) | L | L | L | M | L/H | L | M | L/M | L/M | L |

Table II helps to illustrate the various known characteristics of several types of preforms as employed in metal matrix composites. Such characteristics can be taken into account as desired to design improved hybrid preforms with precisely tailored properties in preselected regions. The information in Table II is provided qualitatively and in what are believed to be accurate relative terms with respect to one another of the various preforms. The information is not intended to be limiting, as the skilled artisan will appreciate. The designation "H" refers to the relative term "high"; "M" refers to the relative term "medium"; "L" refers to the relative term "low"; "Long" means in a longitudinal direction; "Tran" means in a direction transverse to the longitudinal direction. The term "tribology" refers to beneficial performance characteristics of a component in sliding, rubbing, or rolling applications.

To further illustrate the instant hybrid preform concept, FIGS. 6A, 6B, 6C show a hybrid preform prepared according to the methods of the present invention, having the configuration of an internal combustion engine valve 32. The hybrid preform consists of two types of ceramic reinforcement fiber types, continuous length fibers 34 (preferably alumina) and short length fiber 36, e.g., chopped fibers (preferably alumina silica) and/or particulates located and oriented in specific areas within the preform so as to maximize desirable mechanical properties preferably at a minimal cost for such configuration.

As seen in FIG. 6A, the valve includes a stem region 38, a head region 40 adjacent the stem region, and terminates in a valve seat region 42. Accordingly, without intending to be bound by theory, the continuous fibers are located where relatively high strength and stiffness are desired; e.g., substantially along the central length of the valve stem region 38, surrounded by short length fibers 36 (See, FIG. 6C). The continuous fibers also substantially follow the curvature of the valve head region 40 to the seat region 42 to accommodate the tensile and bending forces occurring in operation during valve closure. Continuous fibers (some of which are shown in FIG. 6B), preferably also are located substantially radially, or radially offset slightly, and generally circumferentially in a plane generally taken through the valve seat region 42, to help stiffen the valve head and thereby potentially reduce "dishing". The short length or chopped fibers 36 are located on substantially all outside surfaces of the valve 32 and there take advantage of properties such as high machinability, tribological properties, and low cost.

As shown in FIGS. 6A and 6B, the short length fibers are also located (preferably at a lesser volume fraction) in a central portion of the valve head region 40 and are dispersed among the continuous fibers in the plane of the valve seat region 42. It is believed that there they help provide increased strength and stiffness, and lower the thermal expansion coefficient (relative to an unreinforced matrix) to match the other areas of the valve, thus reducing internal stress risers without incurring excessive costs.

Figure 7:
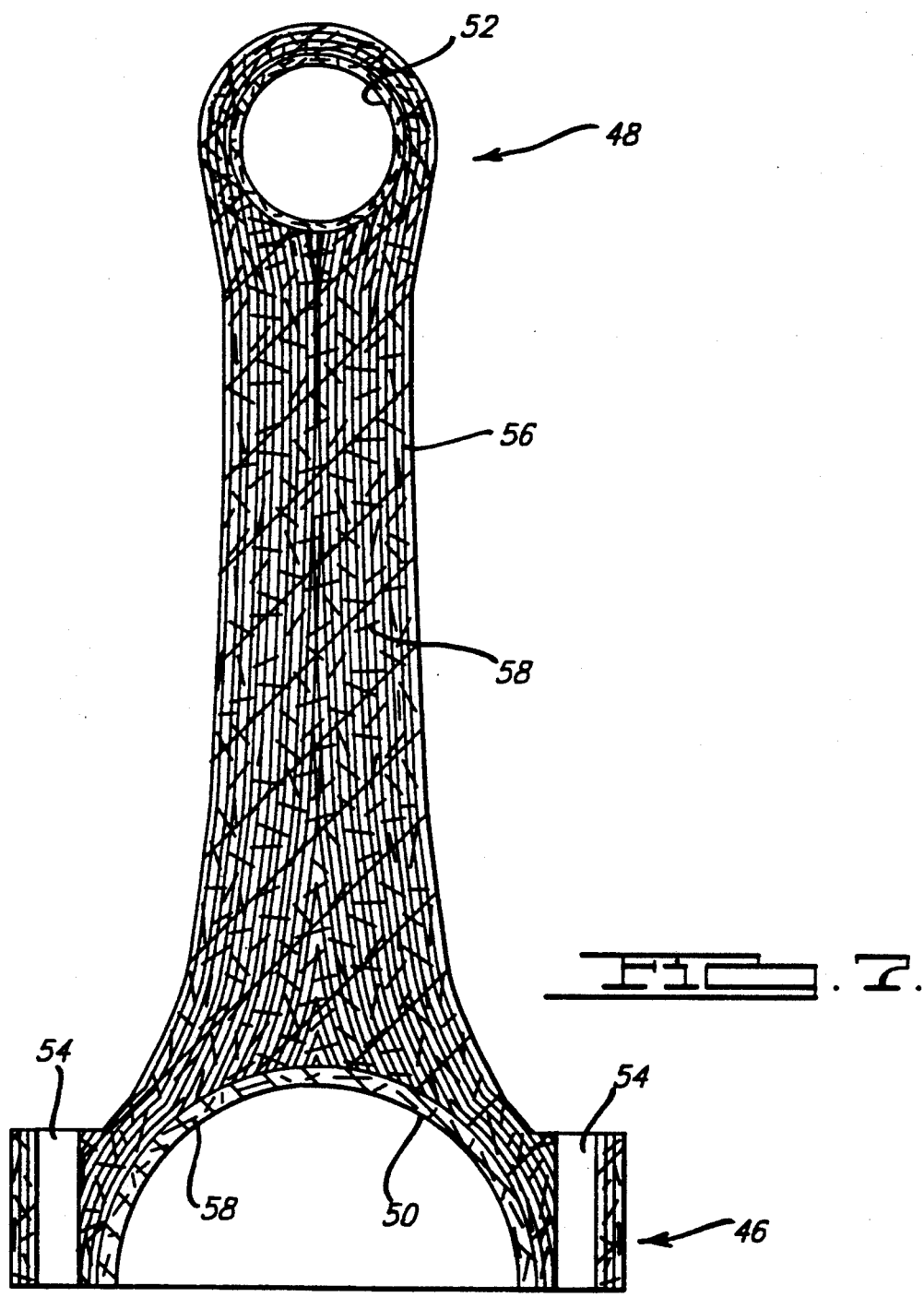
FIG. 7 illustrates a connecting rod preform of the present invention.

Referring to FIG. 7, there is shown a cross-section of a hybrid preform having the configuration of an internal combustion engine connecting rod 44. The connecting rod has a large end region 46 and a small end region 48. The large end region 46 includes a first inner bearing surface 50. The small end region 48 has a second inner bearing surface 52 as well. The large end region 46 is bored to define a plurality of bolt holes 54.

The hybrid preform preferably consists of at least two types of ceramic reinforcement fiber types, continuous fibers 56 and short length fibers 58 (e.g. chopped fibers), and/or particulates. Like with the valve embodiment preferably the fibers are selected and oriented within the preform so as to maximize desirable mechanical properties and minimize cost. Accordingly, without intending to be bound by theory, in this embodiment the continuous fibers 56 are located along the central length of the connecting rod and substantially follow the curvature of the large and small end bearing surfaces 50 and 52 of the connecting rod. In this way it is believed that the structure is able to accommodate the tensile and compressive forces experienced in service. Such continuous fibers 56 preferably also surround and are oriented, at least near the outer edges of the large end region 46, substantially parallel to the major axis of the bolt holes 54 of the connecting rod 44 to help prevent compressive creep under bolt torque tensile loading and subsequent reduction of the bolt clamping force.

The short length fibers 58 are preferably located adjacent to and comprise the inside of bearing surfaces 50 and 52 to take advantage of their high machinability, tribological properties, and relatively low cost. These short fibers are also located (preferably in a lesser volume fraction than elsewhere employed) in the central portion of the connecting rod and are dispersed in a generally random orientation among the continuous fibers as shown in FIG. 7. It is believed that this construction helps to provide increased strength and stiffness in directions which are not parallel to the long continuous fibers, thereby accommodating minor forces experienced by the connecting rod 44 and contributing to the long fiber to long fiber load transfer, and also potentially improving fatigue properties. The relative proportion of long to short fibers may be adjusted to optimize the cost versus strength benefit trade off as desired. In a preferred embodiment of this invention continuous fibers are composed of alumina and short fibers employ alumina-silica compositions.

Figure 8A:
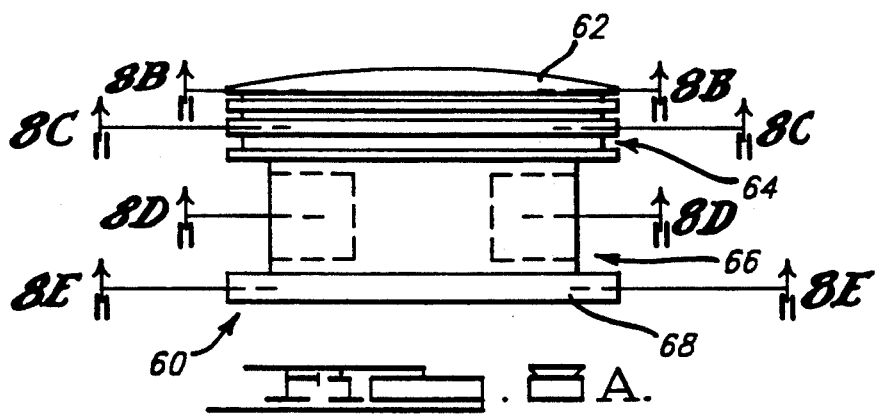
FIG. 8A is an elevation view of a piston preform.

FIGS. 8A-8E show various views of a hybrid preform prepared according to the methods of the present invention for use in making an internal combustion engine piston 60. FIG. 8A shows the piston 60 having a crown 62, a ring groove region 64 adjacent the crown, a wrist pin bore region 66, adjacent the ring groove region, and a skirt 68 adjacent the wrist pin bore region. As with the valve and connecting rod embodiments the hybrid preform includes two type of ceramic reinforcement fiber types, continuous fibers 70 and short length fibers 72, (e.g. chopped fibers) and/or particulates located and oriented in specific areas within the preform so as to maximize desirable mechanical properties and minimize cost.

Figure 8B:
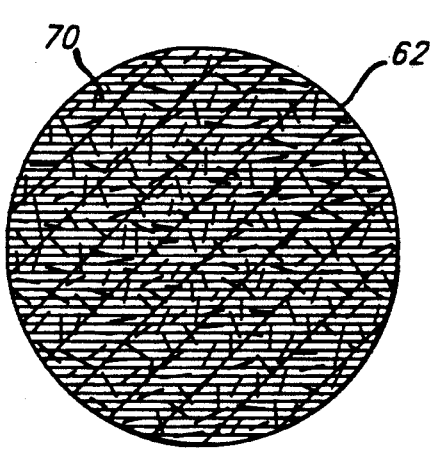
FIG. 8B is a section through 8A.

FIG. 8B shows a section through the piston crown 62, which comprises a mixture of chopped and continuous fibers. A substantial majority of the continuous fibers preferably are oriented such that their longitudinal axis are substantially parallel to the longitudinal axis of a crankshaft (not shown) when assembled in an internal combustion automotive engine.

Figure 8C:
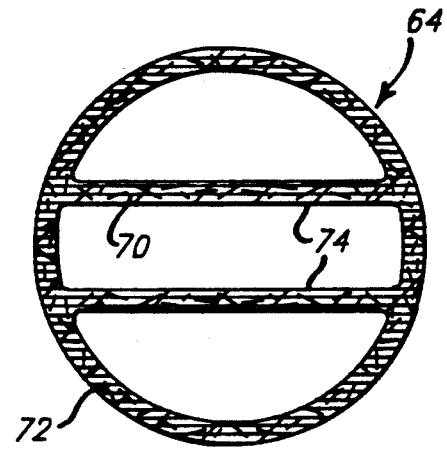
FIG. 8C is a section through 8A.

FIG. 8C shows a section through the ring groove region and includes a depiction of a pair of stiffening ribs 74. The circumference of the region is substantially entirely chopped fiber (optionally including continuous fibers). The stiffening ribs meanwhile comprise a mixture of continuous and chopped fibers. The longitudinal axis of the continuous fibers being oriented substantially parallel to length of the stiffening rib.

Figure 8D:
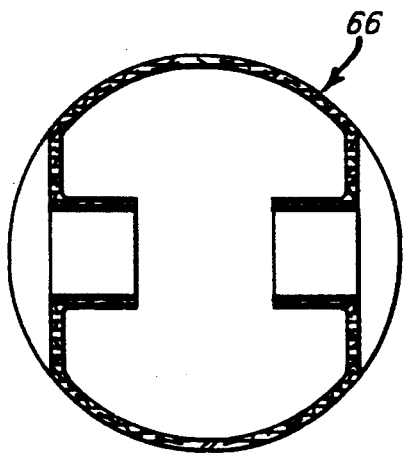
FIG. 8D is a section through 8A.

FIG. 8D shows a section through the wrist pin bore region of the preform which is substantially comprised of chopped fiber (optionally including continuous fibers).

Figure 8E:
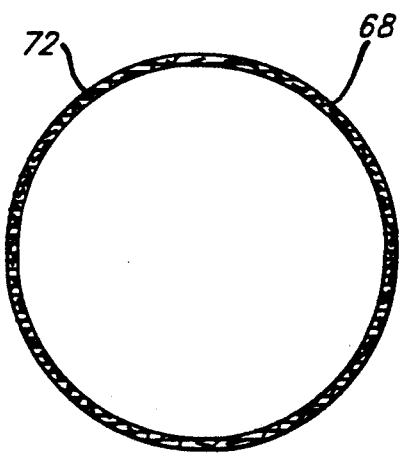
FIG. 8E is a section through 8A.

FIG. 8E shows the skirt 68 of the piston which is likewise substantially comprised of chopped fiber (optionally including continuous fibers).

To elaborate, and without intending to be bound by theory, the continuous fibers are located where minimum thermal expansion coefficient is desired e.g. they are located parallel to a wrist pin bore (not shown), thereby enabling the piston to deform to a substantially oval profile as it reaches operating temperatures approaching a substantially complementary distortion of a mating cylinder bore. The short length fibers are located throughout the piston 60 with random three dimensional orientation. The short length fibers have an overall volume fraction chosen such as to cause the thermal distortion of the piston to substantially match the thermal distortion of a mating cylinder bore. The specific volume fraction of short fibers in any given volume of the piston is preferably selected so as to help minimize internal stresses caused by thermal gradients. Thus the highest in-service temperature regions of the piston will preferably have the highest volume fraction of short length fibers. More specifically the region including the piston crown 62 and ring groove region will preferably have a relatively high volume fraction of short fibers (e.g. up to about 20 volume percent and preferably ranging from about 5 to about 15 volume percent occupied by the reinforcing material).

It is believed that because of the ceramic fiber reinforcement in the ring groove area the high temperature fatigue strength should be improved so as to enable the top piston ring to be disposed higher than in a conventional piston. The thermal distortion "matching" should help enable the use of a reduced piston to cylinder wall clearance for essentially all operating conditions, especially cold start up, relative to an engine with a conventional unreinforced piston, thereby substantially reducing unburned hydrocarbon emissions by reducing the volume of fuel and air mixture that will be trapped in this "crevice volume" defined by such clearance during the combustion event. Additional benefits of the instant metal matrix composite piston are believed to include a reduced likelihood of piston "slap" noise and the ability to design a thin wall light-weight piston that has a substantially reduced reciprocating mass, thus contributing to improving fuel economy and reducing noise and vibration. In a preferred embodiment of this invention, long fibers would be of alumina and short fibers would be of alumina-silica compositions.

Thus, as can be seen, a hybrid preform employs desirable characteristics from multiple types of preforms to arrive at a commercially practical preform.

It is contemplated that the above considerations apply also to the fabrication of numerous other articles useful in the automotive industry. Examples of alternative types of automotive components that can be prepared according to the instant methods, incorporating either homogeneous or hybrid-type preforms, rocker arms, brake yokes, brake rotors, valves, steering knuckles, suspension components, push rods, engine brackets, engine blocks (e.g., such as those with no sleeve required), engine heads, drive shafts and the like.

Another variation of hybrid preforms to make hybrid composites includes a preform which, when employed in a metal matrix composite, results in the distribution of discontinuous reinforcing material (e.g. or the like) in the matrix metal in order to improve compressive monotonic, compressive-compressive fatigue, and tensile-compressive fatigue properties of the resulting composite material as well as increasing off axis (transverse) strength, shear strength and elastic modulus. More specifically, in one embodiment, discontinuous reinforcing material, (e.g., particulates or platelets) can be interspersed in any suitable manner and amount throughout a preform, or in pre-selected portions thereof. In contrast to a preform such as used in the material shown in FIG. 5, a purpose here is to actually accomplish interpenetration as between the discontinuous type preform material and another type of preform material (e.g., continuous fiber).

Without intending to be bound by theory such a structure is believed to increase the compressive strength of the resulting metal material by strengthening the matrix material and thereby substantially inhibit the type of plastic flow characteristic of that leading to, for example, undesirable continuous fiber "kink band" formation. Additionally, it is believed that high and low cycle fatigue characteristics of the material can be substantially improved. For instance, as to low cycle fatigue, the discontinuous reinforcing material (dispersed uniformly) is believed to substantially inhibit the type of plastic flow, as above, that would lead to consequences such as fiber buckling, and resulting potential shortening of the material's life. In addition, such as for high cycle fatigue (resulting often times from cracks forming in the matrix emanating from fibers), it is believed that the discontinuous reinforcing material helps to slow the growth of such cracks and thus increase the life of the metal matrix composite material. Of further note, it is believed that by following this step, problems can be overcome such as those discussed in "Compressive Fatigue damage and Associated Property Degradation of Aluminum Matrix Composite." Y. H. Haung and S. S. Wang. *Proceedings of the Fourth Japan-U.S. Conference on Composite Materials.* June, 1988; and "Tensile/Compressive Fatigue and Interface Characterization of Al2O3 Fiber/Al-2.5% Li Alloy Metal Matrix Composite." M. Buckley and J. Homeny. *ONR-URI Composites Program Technical Report* #90-08. June, 1990; both of which are hereby incorporated by reference.

It is believed that discontinuous reinforcements, which may include some forms of short length fibers (e.g., particulates, platelets, or the like) uniformly distributed throughout the matrix alloy should increase the properties, such as off-axis and shear properties, of the resulting composite material by an amount that can be calculated from the well-known rule of mixtures and thus can be employed in suitable amounts based thereon.

As discussed herein, when employed, the instant discontinuous reinforcement are preferably incorporated into the binder of the preform in any suitable manner during preform manufacture.

PREFORM FABRICATION

The skilled artisan should already be aware of various methods that conventionally could be employed to prepare preforms for use in the present invention. Such methods include flowing methods, slurry methods, hand lay-up methods, suction methods, weaving or winding methods, centrifuging, pressing, electrostatic orienting, or the like.

As will be appreciated, many of the articles described previously herein, and like articles, have complex configurations. Many of such configurations also require relatively precise tolerances and dimensions. Limitations imposed by the above conventional methods may impair the ability to accomplish such tolerances and dimensions. Thus, as an alternative, or even supplemental process for achieving close tolerances and complex configurations, one embodiment of the present invention contemplates a particular set of steps for fabricating near net shape or net shape preforms prior to casting that results in relatively high integrity reinforcing material preforms. In general, the present preform fabrication embodiment involves one or more preform fabrication techniques selected from water jet machining, tool machining, warm forming, injection molding or combinations.

The water jet machining method involves subjecting a preform (either containing, or being substantially devoid, of a binder) to a stream of water (having a predetermined cross-sectional area) that flows from a source of water (such as a nozzle) at a relatively high velocity. Factors such as the flow rate and velocity of water, the cross-sectional area of the stream of water, or the like can be varied to thus accomplish cutting or machining of the reinforcing material.

The flow rate of water may be any suitable flow rate for accomplishing cutting of the preform. Preferably the slowest flow rate of water that accomplishes cutting should be used. Any suitable cross-sectional area (i.e. the area that directly impinges upon the preform) of the stream of water to accomplish cutting could be used, and preferably for precision cutting the smallest cross-sectional area that accomplishes cutting should be used.

While maintaining the above conditions, a preform (such as a continuous fiber preform) is positioned relatively close to the source of water. With the water flowing against the preform, moving the preform relative to the source of water, or vice versa, should result in cutting of the preform. Unlike some conventional cutting methods (such as sawing), the present method results in a relatively precise cut with relatively minor displacement or damage to the reinforcing material at or near the region of the cut.

For instance, the cross-sectional geometry (i.e. the cross-sectional configuration of a plane defined by the contact point where water impinges on the reinforcing material) of the stream of water can be varied by selecting an appropriate nozzle for dispensing water from the water source. In a present preferred embodiment the cross-sectional geometry preferably defines a generally circular pattern, wherein the diameter of such generally circular pattern is approximately as low as about 0.001 inches.

The tool machining methods of the present invention contemplate employing any suitable cutting tools. Preferably the tool is operated at the highest cutting speed that is practicable, taking care to keep the tool substantially free of binder build up.

The warm-forming methods of the present invention include the steps of heating a reinforcing material, which is held together by a binder, to a temperature of about the softening point of the binder. For instance, for a preform that employs a binder made of carnauba wax and a fibrous reinforcing material, the preform is heated to a temperature of about 140° F. to about 180° F. Higher or lower temperatures may also be employed. Pressure is then applied to the preform in an amount sufficient to plastically deform the binder and thereby form the preform into a preselected shape. For example, for the above described preform a pressure of at least about 0.5 psi, and more preferably about 0.5 to about 600 psi is employed. The pressure is maintained for a time sufficient to form the desired shape, and preferably for a period of about 1 minute to about 3 hours. Of course, depending upon the temperatures and pressures employed, these times can be longer or shorter. Time, temperature and pressures, as with many of the steps herein, can be varied according to such factors as the content, size and shape of the preform, and the like.

It is contemplated that this warm forming method may also involve the employment of a suitable die or other tooling having a predetermined configuration. Pressure applied to the die, while the die is in contact with the preform should cause the preform to form into a configuration according to such die.

In addition, it is contemplated that a cavity formed in the die could be evacuated to aid in the forming process. Further, the use of a suitable viscosity modifying additive in the binder may be desirable from the standpoint of enhancing the ability of fibers to slide over one another, thus reducing the likelihood of fiber breakage when pressures are applied.

Hence, it can be seen that, preferably, the present preform fabrication methods are employed under such conditions so as to help minimize the possibility of fracture of the reinforcing materials in the preform.

The injection molding methods of the present invention contemplate (1) the placement of reinforcing material in a cavity of a mold and injecting a binder into the mold cavity using known injection molding methods or (2) preparing an admixture of fibers and binder which is injection molded into a mold cavity to form a near-net-shape preform.

For better control over resulting properties of injection molded preforms, in many instances it is undesirable to unnecessarily deform reinforcing materials in the preform. Thus, to help avoid deforming the reinforcing materials, such as fibers, the sequence of steps for injection molding generally contemplates injecting the binder into the mold cavity subsequent to the placement of reinforcing material into the cavity. In some instances, however, it may actually be desirable to admix a discontinuous or short length reinforcing material as previously discussed with the binder prior to injection molding. That is, according to one aspect of the present invention also already discussed, it is believed that the mechanical (e.g. fatigue) characteristics of metal matrix composite articles can be enhanced by injection molding a binder previously admixed with reinforcing material.

In another embodiment, reinforcing material and binder is injection molded according to the above steps to first form a "sub-assembly" preform part. By "sub-assembly preform", as used herein, is meant a preform that constitutes only a portion of an overall preform and which, when combined with one or more other sub-assembly preforms, results in the overall final preform. The first sub-assembly preform can then be assembled with additional sub-assembly preforms into an overall preform and placed in a mold for casting. Alternatively, the first sub-assembly preform can be placed in a mold cavity and injection molded with a reinforcing material/binder admixture of a different type as the first sub-assembly preform. For example, without limitation, the different type of preform may include a different reinforcing material type, a reinforcing material of the same material type, but with a different packing density of reinforcing material, a preform with a different degree of orientation, or mixtures thereof. In this manner, precision net shape or near net shape hybrid preforms can be prepared which exhibit relatively high integrity and precisely tailored characteristics.

PRECONDITIONED PREFORMS

In an alternative preferred embodiment the reinforcing material is provided as a preconditioned reinforcing material. As used herein, the term "precondition" refers to the act of contacting at least part of a reinforcing material with an "effective amount of a preconditioning material," i.e. an amount of a material sufficient to interact with the reinforcing material to show a significant and reproducible improvement in one or more wetting characteristics of the reinforcing material. Without limitation, an example of an improved wetting characteristic would be the reduction of the contact angle that forms between a droplet of molten matrix metal and the reinforcing material which it contacts during casting steps. The step of preconditioning employed in the present invention may occur prior to or subsequent to the fabrication of a preform. In a present preferred embodiment, preconditioning takes place after the preform has been fabricated to its ultimate shape and density. It may also be preferable to precondition at or about the time that the binder is removed from the preform.

While it is contemplated that a number of preconditioning materials may be employed in the methods and articles of the present invention, a preferred preconditioning material is one that contains chromium. In this regard, the chromium preconditioning material of the present invention can be provided in any suitable form, such as in its pure, or substantially pure, elemental form, in its ionic form, as part of a metal alloy composition, as part of a matrix metal composition, as part of an intermetallic or as part of a like chromium-containing compound. In this regard, the chromium may be provided in any suitable physical state including its solid, liquid or vapor states. For instance, when provided in solid state, chromium could be provided as sheet, strip, rod, bar, plate, tube, foil, powder (either compacted or non-compacted), granular, flake, whisker or the like.

Further, it is contemplated that chromium-containing compounds admixed with ceramic mold materials will provide chromium vapor in a manner similar to that which would result from using, in the process of the present invention, a chromium bearing metal contained in a stainless steel mold.

Particular examples of suitable preconditioning materials include, without limitation, stainless steels (such as AISI types 430, 304, or like chromium containing stainless steels), chromium-containing intermetallic compounds, nickel-chromium intermetallic compounds, chromium salts (such as, but not limited to, ammonium chromate, potassium dichromate, sodium dichromate, hydrous-chromium perchlorate, and mixtures thereof). Other specific examples of chromium-containing materials include, without limitation, pure chromium, chromium-halogen compounds such as chromium-chloride ($CrCl_3$), chromium-fluoride ($CrF_3$), and chromium-bromide ($CrB_3$), chromium-containing gas (such as a chromium chloride gas), or mixtures thereof.

To accomplish preconditioning, the preconditioning material is placed adjacent to the reinforcing material, either in direct contact with the latter, or spaced apart from the latter at a predetermined spacing, sufficient to permit the preconditioning material to contact the reinforcing material during processing, as discussed in further detail herein.

In general, the instant preconditioning step contemplates that the preconditioning material is acted upon to cause migration or transport of the preconditioning material to the preform. Generally, such step is accompanied by a heating step, in order to promote a more rapid preconditioning reaction. It should be noted that such heating step may be a separate heating step or may occur simultaneously with one or more of the heat-employing steps (e.g. during binder burnout, mold firing, mold preheat, or melting and pouring of matrix metal). Alternatively, the heating step may be performed as a separate step prior to pouring molten matrix metal.

It will be appreciated that during the instant preconditioning step, the preconditioning material can be positioned relative to the reinforcing material in a manner such that the entire mass of reinforcing material, or only a preselected portion of the reinforcing material, is adjacent to the preconditioning material. It should be recognized, however, that only a portion of the entire mass of reinforcing material need be adjacent to the preconditioning material to improve the wetting characteristics of the overall reinforcing material. In some circumstances, such as where complex preform configurations are to be fabricated, it may be desirable to selectively control wetting characteristics of the mass of reinforcing material using these steps.

Without intending to be bound by theory, following the above steps, the preconditioning material, preferably chromium, interacts with the reinforcing material and becomes chemically incorporated into the surface of the ceramic reinforcing material. While only incorporated in relatively small concentrations it is believed that such concentrations are sufficient enough to favorably affect the thermodynamics and kinetics of the reaction that occurs between the reinforcing material and molten matrix metal upon casting the molten matrix metal.

In a highly preferred embodiment, the preconditioning material is provided for preconditioning in the form of a chromium-containing stainless steel. More preferably, the stainless steel is used as a material for the mold in which the metal matrix composite article is to be cast. A ceramic fiber preform (such as alumina or mullite) is placed in the mold having the stainless steel. Binder is burned out in an ambient air atmosphere, and the preform and mold is transferred to a chamber suitable for casting, where it is cast.

In some instances, such as when a binder is not employed as part of a preform of reinforcing material, a preferred method for contacting the preconditioning material with the reinforcing material is to evaporate chromium over some or all of the reinforcing material. This can be accomplished using known vapor transport techniques, such as chemical vapor deposition techniques, for the particular preconditioning material involved.

For example, to precondition a reinforcing material with a chromium vapor, a source of chromium is provided. Such a chromium source is preferably a chromium-containing material (such as a halogen salt compound of chromium, e.g. chromium chloride).

The preconditioning material and the source of chromium are placed in a suitable chamber. Known vapor deposition techniques for depositing chromium-containing materials onto the surface of a substrate can then be employed. Preferably the temperature and pressure conditions are chosen so that evaporation of at least part of the source of chromium can be accomplished. In the present preferred embodiment, in addition to a salt such as chromium chloride, hydrogen or equivalent preferably is present in the chamber to promote evaporation. The chromium vapors are allowed to contact the surface of the reinforcing material for an amount of time sufficient to contact reinforcing material to the desired depth or area of coverage with the preconditioning material, as the skilled artisan will appreciate.

In a like manner to the above-described vapor deposition method, it is also possible to contact the reinforcing material with preconditioning material using conventional plasma spray methods. For instance, either the preform, the surface defining the casting mold cavity, portions of the above, or all of the above, can be plasma sprayed with pure chromium or a chromium-containing material (such as a metal alloy). The preform can then be placed in the mold cavity and a metal matrix composite article can be cast. It should be noted that the mold optionally may be a stainless steel mold.

In an alternative preferred embodiment, reinforcing material is contacted with the preconditioning material by wet chemistry methods. For instance, a predetermined amount of a preconditioning material is provided in a liquid solution form capable of supplying chromium in a generally ionic form.

Specific examples of preferred wet chemical preconditioning materials include solutions containing one or more of chromic acid, potassium dichromate, and chromium perchlorate.

The wet chemical preconditioning material preferably is contacted with the reinforcing material by washing the reinforcing material with the preconditioning material, or by immersing the reinforcing material in a bath of preconditioning material. Of course, other suitable contacting techniques may be employed. Preferably, such washing and/or immersing step is carried out with the wet chemical preconditioning material solution being maintained at a temperature in the range of about room temperature to about the boiling point of the solution containing the preconditioning material, and for a length of time sufficient to achieve wetting of the reinforcing material with the preconditioning method.

Alternative techniques for contacting the reinforcing material include conventional application techniques such as, without limitation, spraying, brushing, rolling, and the like.

The amount of the preconditioning material that is employed in the present preconditioning steps can be varied according to the wetting characteristics desired for the reinforcing material. For instance, the amount of preconditioning material relative to the overall amount of reinforcing material in a preform will vary depending upon whether such preconditioning material is employed locally or selectively (as discussed above) or is employed over the entire amount of reinforcing material. In one embodiment, however, the amount of preconditioning material preferably is an amount sufficient to yield approximately a monatomic layer of chromium on the surface of the preform reinforcing material (e.g. about one gram per about 534 square meters of reinforcing material). Lower amounts are also possible and may be as low as about 1 gram (or less) per 534,000 square meters of preform reinforcing material (i.e., about one chromium atom per about 1000 surface atoms). As can be appreciated from this discussion, even though higher depths of concentration are possible, preferably such amounts of preconditioning material are concentrated at or near the surface of the reinforcing material in the preform.

CASTING MOLDS

Turning again to FIG. 2, an investment casting mold 12, is formed using known methods, to house the preform 10 during casting. As shown in FIG. 2 the preform 10 is used as a pattern for fabrication of the mold cavity 14. A preferred mold for the present invention should be made from a suitable fine grain ceramic material so that the resulting mold is substantially gas tight. Suitable materials include one or more of alumina ($Al_2O_3$), silica ($SiO_2$), zircon ($ZrO_2$-$SiO_2$), zirconia ($ZrO_2$), mullite ($Al_2O_3$-$SiO_2$), boron oxide, boron carbide, boron nitride (BN), aluminum nitride (AlN), silicon-aluminum-oxynitride (SiAlON), or the like.

Conventional methods may be employed to make the present mold. In a specific example of one preferred aspect, a slurry admixture is prepared that includes about 28 to about 30 parts by weight of a saturated colloidal ceramic (e.g. $Al_2O_3$, $SiO_2$, $ZrO_2$ or the like)

suspended in water with about 70 to about 72 parts by weight of a ceramic flour (i.e. having a particle size of about 70 to about 80% less than 325 mesh size powder). The ceramic flour likewise may be $Al_2O_3$, $SiO_2$, $ZrO_2$ or the like. Antifoam agents, wetting agents or both may optionally be added, and if added are present in an amount (e.g. less than about 0.1% by weight) sufficient to promote the substantial elimination of trapped air in the slurry admixture and to promote the substantially complete admixing of the slurry admixture.

The mold is prepared by attaching a preform, and preferably a wax impregnated preform, to an article with provisions for forming a pouring sprue. For instance, such article could be a wax model having a funnel-like configuration. The preform and wax model together are dipped in a wash coat.

This coat, which is preferably composed of, but not limited to, stabilized zirconia or magnesia, serves to reduce vigorous reactions between the liquid metal and the mold material which might occur upon casting. Other suitable wash coat materials include $Al_2O_3$, $ZrO_2$-$SiO_2$, zirconia ($ZrO_2$) or the like. For a highly preferred embodiment, the wash coat is $ZrO_2$ in a colloidal silica or other ceramic suspending agent which has a viscosity of about 35–60 seconds #5 ZAHN, at about 68°–75° F. The mold can be contacted with the wash coat by any suitable manner, such as by dipping. Air bubbles formed in the wash coat are broken by any suitable method, such as by blowing. The mold and partially dried wash coat are then dipped in the slurry admixture to form one or more slurry layers.

The slurry admixture for making the slurry layers preferably has a viscosity ranging from about 40 to about 65 seconds #5 ZAHN. Of course, the viscosity may vary according to such factors known in the art, like the atmospheric conditions in the mold-drying room (temperature, humidity, and air flow). In the present invention the viscosity preferably is such that the final density of the mold can be at or near its theoretical optimal. The slurry is maintained at about room temperature, and the precoated preform and wax model remain in the slurry for a time sufficient for solids in the slurry to adhere to the preform and wax model and form a layer (having a thickness ranging from about 0.05 to about 0.3 inches; larger or smaller thicknesses, of course, being possible) of solids. The solids from the slurry are dried by any suitable method. These steps are repeated until the desired mold thickness is reached. An additional stuccoing step may also be employed to more rapidly build the desired final wall thickness.

In an alternative preferred embodiment, the molds of the present invention are substantially gas tight, and are fabricated from a suitable metallic material. In this regard, preferred metals that may be employed include metals that have a melting point that is substantially greater than the melting point of the matrix metal of the ultimate metal matrix composite and are substantially free of elements that would react with the matrix metal and/or reinforcing material to generate undesirable reaction products. By way of example, for preparing a metal matrix composite that includes $Al_2O_3$ reinforcing material dispersed in a matrix of an aluminum alloy, a stainless steel mold is employed.

Any suitable stainless steel may be employed. In a particularly preferred embodiment, the stainless steel mold has a composition designated as type 304. Other preferred types of stainless steels include types 305, 309 or 310 and stainless steels designated as a 400 or 500 series type stainless steel (e.g. 403, 405, 409, 501, 502 or the like).

The above metal molds are prepared by welding and/or clamping (to allow for re-use of the mold) formed stainless steel sheet into the desired configuration.

An example of a suitable configuration of a metal mold is shown in FIG. 4. It is also possible that the ceramic and metal molds of the present invention may be incorporated into a single composite mold. By this, it is contemplated that metallic insert may be selectively employed in combination with a ceramic mold. Likewise, a ceramic insert may be employed selectively in combination with a metallic mold. The skilled artisan will appreciate that a clampable ceramic coated, shaped steel mold (e.g. a permanent mold) may likewise be employed, thereby allowing the mold to be re-used.

While the present invention has been disclosed in connection with various preferred embodiments thereof, it should be understood that there may be other embodiments which fall within the spirit and scope of the invention and that the invention is susceptible to modification, variation and change without departing from the proper scope or fair meaning of the following claims.

What is claimed is:

1. A method of producing a ceramic reinforced composite material, said method comprising the steps of:
   (a) preconditioning a mass of ceramic reinforcing material with a preconditioning material;
   (b) housing said mass of ceramic reinforcing material in a mold;
   (c) heating said mold;
   (d) melting an aluminum alloy;
   (e) heating said molten aluminum alloy to a temperature in the range of about 1,800° F. to about 2,200° F.;
   (f) pouring said molten aluminum alloy into said heated mold, said heated mold being evacuated to a first pressure which is below atmospheric pressure prior to pouring said molten aluminum alloy;
   (g) almost immediately after pouring said molten aluminum alloy, applying a second pressure greater than said first pressure to rupture an oxide layer formed from said molten aluminum alloy to permit said molten aluminum alloy to wet said mass of ceramic reinforcing material, said second pressure being in the range of about 760 to about 1500 mm Hg; and
   (h) solidifying said molten aluminum alloy.

2. A method according to claim 1 further comprising placing said mass of reinforcing material into a substantially gas tight mold.

3. A method according to claim 1 wherein said mass of reinforcing material is preconditioned with a chromium-containing material.

4. A method according to claim 1 wherein said preconditioning step (a) is accomplished by vapor depositing said preconditioning material.

5. A method according to claim 1 wherein said preconditioning step (a) is accomplished by contacting said reinforcing material with a chemical solution containing said preconditioning material.

6. A method according to claim 1 wherein the amount of said mass of preconditioning material is sufficient to result in substantially a monatomic layer of chromium on a surface of said reinforcing material.

7. A method according to claim 1 wherein said preconditioning material is provided for preconditioning in the form of a chromium-containing stainless steel.

8. A method of producing a ceramic reinforced composite material, said method comprising the steps of:
   (a) providing a mold, said mold housing a preform containing a mass of ceramic reinforcing material in the shape of an automotive component;
   (b) heating said mold;
   (c) melting an aluminum alloy;
   (d) heating said molten aluminum alloy to a temperature in the range of about 1,800° F. to about 2,200° F.;
   (e) pouring said molten aluminum alloy into said heated mold, said heated mold being evacuated to a first pressure which is below atmospheric pressure prior to pouring said molten aluminum alloy;
   (f) almost immediately after pouring said molten aluminum alloy, applying a second pressure greater than said first pressure to rupture an oxide layer formed from said molten aluminum alloy to permit said molten aluminum alloy to wet said mass of ceramic reinforcing material, said second pressure being in the range of about 760 to about 1500 mm Hg; and
   (g) solidifying said molten aluminum alloy.

9. A method according to claim 8 further comprising placing said mass of reinforcing material into a substantially gas tight mold.

10. A method according to claim 8 wherein said preform has the shape of an automotive component selected from the group consisting of connecting rod, rocker arm, brake yoke, brake rotor, piston, engine valve, steering knuckle, suspension component, push rod, engine bracket, engine block, engine head, and drive shaft.

11. A method according to claim 8 wherein said preform has the shape of a connecting rod.

12. A method according to claim 8 wherein said preform has the shape of an engine valve.

13. A method according to claim 8 wherein said preform includes a continuous fiber portion and a chopped fiber portion.

14. A method according to claim 8 wherein said preform has the shape of an engine valve and includes a continuous fiber portion and a chopped fiber portion.

15. A method of producing a ceramic reinforced composite material, said method comprising the steps of:
   (a) providing a mold, said mold housing a mass of ceramic reinforcing material provided as a hybrid preform containing at least two types of reinforcing material selected from continuous fibers, chopped fibers, mat fibers, fiber whiskers, foam or mixtures thereof;
   (b) heating said mold;
   (c) melting an aluminum alloy;
   (d) heating said molten aluminum alloy to a temperature in the range of about 1,800° F. to about 2,200° F.;
   (e) pouring said molten aluminum alloy into said heated mold, said heated mold being evacuated to a first pressure which is below atmospheric pressure prior to pouring said molten aluminum alloy;
   (f) almost immediately after pouring said molten aluminum alloy, applying a second pressure greater than said first pressure to rupture an oxide layer formed from said molten aluminum alloy to permit said molten aluminum alloy to wet said mass of ceramic reinforcing material, said second pressure being in the range of about 760 to about 1500 mm Hg; and
   (g) solidifying said molten aluminum alloy.

16. A method according to claim 15 further comprising placing said mass of reinforcing material into a substantially gas tight mold.

17. A method according to claim 15 wherein said hybrid preform includes a continuous fiber portion and a chopped fiber portion.

18. A method according to claim 15 wherein said hybrid preform further comprises a foam preform.

19. A method according to claim 17 wherein said hybrid preform includes a continuous fiber portion and has a discontinuous reinforcing material interspersed in said continuous fiber portion.

* * * * *

UNITED STATES PATENT AND TRADEMARK OFFICE
CERTIFICATE OF CORRECTION

PATENT NO.   :   5,199,481
DATED        :   April 6, 1993
INVENTOR(S)  :   Corwin, et al It is certified that error appears in the above-indentified patent and that said Letters Patent is hereby corrected as shown below:

ON THE TITLE PAGE, in Assignee item #73, insert --Chrysler Corporation--.

Signed and Sealed this

Fifth Day of July, 1994

Attest:

BRUCE LEHMAN

*Attesting Officer*            *Commissioner of Patents and Trademarks*